Feb. 19, 1924.

D. L. AUSTIN

CONVEYER

Filed March 6, 1922

1,484,248

Inventor:
David L. Austin,
By Dodge and Sons,
Attorneys.

Patented Feb. 19, 1924.

1,484,248

UNITED STATES PATENT OFFICE.

DAVID L. AUSTIN, OF HONOLULU, TERRITORY OF HAWAII, ASSIGNOR TO THEO. H. DAVIES & CO., LTD., OF SAN FRANCISCO, CALIFORNIA, A FIRM.

CONVEYER.

Application filed March 6, 1922. Serial No. 541,401.

*To all whom it may concern:*

Be it known that I, DAVID L. AUSTIN, a citizen of the United States, residing at Honolulu, Territory of Hawaii, have invented certain new and useful Improvements in Conveyers, of which the following is a specification.

This invention pertains to conveyers, and more specifically to conveyer belts employed for the purpose of transporting sliced fruit from one point to another, as, for instance, from a peeling and slicing machine to packers who remove the sliced fruit from the conveyer and stack it in cases or other containers.

Specifically the invention comprises an endless rubber belt provided with a plurality of spaced ribs extending longitudinally of the belt and so shaped and spaced as to facilitate the removal of the slices of fruit from the belt.

The invention is illustrated in the annexed drawings, wherein,—

Figure 1:
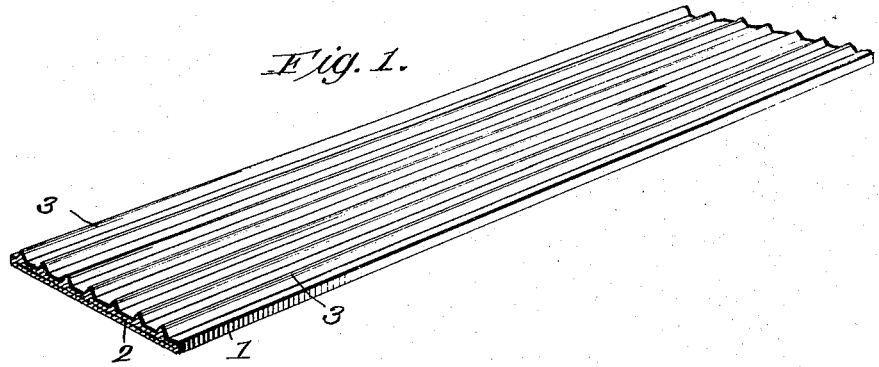

Fig. 1 is a perspective view of a section of the belt; and

Figure 2:
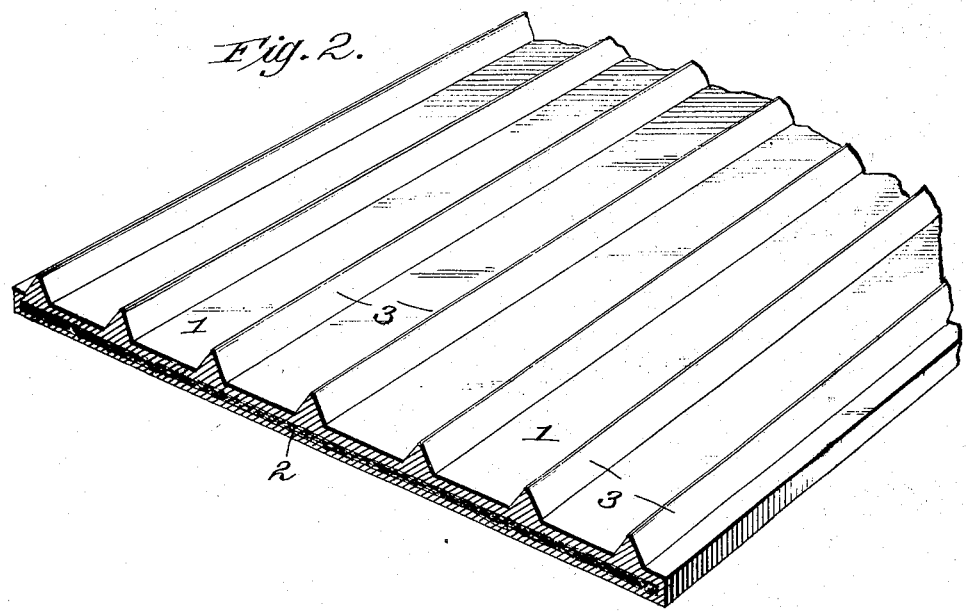

Fig. 2 a similar view upon an enlarged scale designed to more clearly show the conformation of the ribs and the belt structure as a whole.

In the canning industry it is advantageous to maintain the fruit slices in a perfect condition and the present belt enables this to be done. Where a plain belt is employed the slices are frequently broken and have to be discarded or packed as seconds. The belt illustrated in the annexed drawing overcomes these difficulties and enables the operator to readily remove the slices.

In said drawing, 1 denotes the body of the belt, preferably formed with an interior strengthening member 2 produced of fabric. Formed upon the outer face of the belt is a series of inverted V-shaped ribs 3. which ribs extend parallel to each other in the direction of the length of the belt and are preferably equidistantly spaced. Moreover, they are spaced apart a distance materially greater than their height. They are of such height as to hold the fruit slices above the outer face of the main body of the belt to such an extent or distance that the operator may readily slip his finger, or a tool, under the oncoming fruit as the belt travels towards the operator. The fact that the ribs have an inverted V-shaped form produces a relatively narrow line of contact between the fruit and the supporting ribs so that no suction inheres between the fruit and the belt.

It is, of course, conceivable that the ribs need not be brought to a sharp edge at their extremity, and, in fact, in the formation of the belt as indicated in the drawing, the ribs are slightly rounded so as to prevent breakage and undue wear.

With a belt thus formed and produced from acid-proof rubber, the belt will wear for a considerable period of time and the fruit slices conveyed thereby will be unaffected. Moreover, the belt may be readily cleansed and kept in a sanitary condition.

I am aware that various belts having ribs of one or another form have been heretofore employed, but such belts are not adapted for the purpose of the present invention and are incapable of being used for the purpose above set forth.

What is claimed is,—

A conveyer belt for fruit slices, comprising a relatively flat body, the outer face whereof has a series of inverted V-shaped ribs extending lengthwise thereof in parallel relation, the ribs being spaced a distance apart materially greater than the height of the ribs so that one may pass his fingers inwardly between the ribs and beneath the fruit slice which may rest thereon.

In testimony whereof I have signed my name to this specification.

DAVID L. AUSTIN.